United States Patent [19]

Shimizu et al.

[11] 4,454,092

[45] Jun. 12, 1984

[54] METHOD OF PRODUCING PARTIALLY CROSSLINKED RUBBER-RESIN COMPOSITION

[75] Inventors: Shizuo Shimizu; Shunji Abe; Akira Matsuda, all of Higashi, Japan

[73] Assignee: Mitsui Petrochemical Industries, Ltd., Tokyo, Japan

[21] Appl. No.: 405,549

[22] Filed: Aug. 5, 1982

[30] Foreign Application Priority Data

Aug. 7, 1981 [JP] Japan .................................. 56-123643

[51] Int. Cl.³ .............................................. B29B 1/10
[52] U.S. Cl. .................................... 264/349; 264/141; 264/171; 264/211; 525/197; 525/232; 525/240
[58] Field of Search ............ 264/349, 171, 211, 210.6, 264/140–143, 236, 347; 425/203, 204; 525/232, 197, 240

[56] References Cited

U.S. PATENT DOCUMENTS

| | | | |
|---|---|---|---|
| 2,813,302 | 11/1957 | Beck | 425/204 |
| 3,525,124 | 8/1970 | Ocker | 425/204 |
| 3,586,089 | 6/1971 | Mato et al. | 159/2 E |
| 3,701,702 | 10/1972 | Shichman et al. | 264/236 |
| 3,796,677 | 3/1974 | Laber et al. | 525/222 |
| 3,862,265 | 1/1975 | Steinkamp et al. | 525/192 |
| 3,965,055 | 6/1976 | Shichman et al. | 264/236 |
| 4,065,532 | 12/1977 | Wild et al. | 264/349 |
| 4,113,822 | 9/1978 | Takiura et al. | 264/349 |
| 4,197,381 | 4/1980 | Alia | 264/349 |

FOREIGN PATENT DOCUMENTS

2725150 12/1978 Fed. Rep. of Germany ...... 264/236

*Primary Examiner*—Jeffery R. Thurlow
*Attorney, Agent, or Firm*—Armstrong, Nikaido, Marmelstein & Kubovcik

[57] ABSTRACT

A method of producing partially crosslinked rubber-resin composition comprising directly feeding a pelletized peroxide-curable olefin copolymer composition, a peroxide-decomposing polyolefin resin and an organic peroxide compound to a twin-screw extruder under specific extruding conditions of weight of the copolymer rubber and specific energy at extrusion.

5 Claims, No Drawings

METHOD OF PRODUCING PARTIALLY CROSSLINKED RUBBER-RESIN COMPOSITION

BACKGROUND OF INVENTION

1. Field of the Invention

The present invention concerns a method of producing partially crosslinked rubber-resin composition. More particularly, it concerns the method of producing the partially crosslinked rubber-resin composition comprising dynamically heat treating a peroxide-curable olefin copolymer rubber and a peroxide-decomposing polyolefin resin in the presence of an organic peroxide.

2. State of the Art

Various methods are used in production of partially crosslinked rubber-resin composition comprising a partially crosslinked peroxide-curable olefin copolymer rubber and a polyolefin resin. As the olefin copolymer rubber, ethylene/propylene copolymer rubber and ethylene/propylene/non conjugated polyene copolymer rubber are typical. The method which comprises melting and kneading the copolymer rubber with an organic peroxide in a Banbury mixer as the dynamic heat treatment for the partial crosslinking followed by mixing with a polyolefin resin, and the method which comprises melting and kneading the copolymer rubber with an organic peroxide in a Banbury mixer in the presence of a peroxide-decomposing polyolefin resin such as polypropylene are batchwise process, and therefore, not economical way of production. Further, in the former it is difficult to obtain the product of constant quality because of insufficient mixing of the partially crosslinked rubber and the polyolefin resin.

In order to obtain the partially crosslinked rubber-resin composition having constant quality given by homogeneous mixing of the partially crosslinked copolymer rubber and the polyolefin resin, it is preferable to preliminarily melt and mix the copolymer rubber and the peroxide-decomposing polyolefin resin such as polypropylene to form particle, and then, to melt and knead the particle with an organic peroxide in an extruder for the dynamic heat treatment. This method is also not advantageous because of necessity of the preliminary step of melting and mixing the copolymer rubber and the polyolefin resin.

Thus, there has been demand for the method of melting and kneading the copolymer rubber and the peroxide-decomposing polyolefin resin in the presence of an organic peroxide for the dynamic heat treatment which is carried out continuously.

SUMMARY OF THE INVENTION

The object of the present invention is to provide an economical and advantageous method of producing partially crosslinked rubber-resin composition in single step and continuous way.

We have sought the method of producing homogeneously mixed partially crosslinked copolymer rubber-resin composition having good properties. We found that the conventional single screw extruder would not give the desired composition, and that the above object can be achieved by using a twin-screw extruder, preferably under specific extrusion conditions.

PREFERRED EMBODIMENTS OF THE INVENTION

According to our experience, size of the copolymer rubber particle to be fed to the twin-screw extruder gives significant influence on the properties of the product composition. Also, mechanical energy given by the twin-screw extruder to the materials fed thereto will influence to dispersibility of the partially crosslinked copolymer rubber and the polyolefin resin. The specific energy, which is correlated to the size of the copolymer rubber particle, should exceed a certain level for the purpose of homogeneous mixing of the materials and obtaining the partially crosslinked rubber-resin composition having good properties.

It is preferable to carry out the present method of producing the partially crosslinked rubber-resin composition comprising directly feeding particle of the peroxide-curable olefin copolymer rubber and the peroxide-decomposing polyolefin resin with an organic peroxide to a twin-screw extruder so as to dyamically heat treat the materials under the condition:

$$Z \leq 25$$

where "Z" stands for the longer diameter (mm) of the rubber particle, and more preferably, under further conditions:

$$X \leq 200$$

$$Y \geq 0.003 X + 0.12$$

wherein "X" stands for the weight of the rubber particle (g/100 particle), and "Y" stands for the specific energy by the extruder (KWhr/kg).

The peroxide-curable olefin copolymer rubber to be partially crosslinked may be essentially amorphous, elastic copolymer mainly composed of olefins, such as ethylene/propylene copolymer rubber, ethylene/propylene/non conjugated diene terpolymer rubber, ethylene/butene copolymer, ethyleIne/1-butene/non conjugated diene terpolymer rubber and ethylene/butadiene copolymer rubber, which elastic copolymer may be crosslinked when mixed with an organic per oxide and kneaded under heating to form a rubber of less or little fluidity. These ethylene/alpha-olefin/(non conjugated polyene) copolymer rubber is made by copolymerizing ethylene and the alpha-olefin of 1 to 12 carbon atoms (e.g., propylene, butene-1, pentene-1, hexene-1, 4-methyl-1-pentene and 5-methyl-1-hexene) in a molar ratio of preferably about 50/50 to 95/5, more preferably, about 55/45 to 85/15. In cases where a non-conjugated polyene such as dicyclopentadiene, 1,4-hexadiene, cyclooctadiene, vinyl norbornene, methylene norbornene or 5-ethylidlene-2-norbornene is copolymerized, it is preferable that the polyene is contained in such amount that iodine valve may be not more than about 50, preferably about 40 or less. Preferable Moony viscosity $ML_{1+4}$ (100° C.) of the copolymer rubber is about 10 to 100, particularly about 40 to 150.

As the peroxide-decomposing polyolefin resin, the following resins may be used: crystalline polypropylene-based resin such as homopolymer of propylene, and copolymer of propylene and an alpha-olefin having 2 to 10 carbon atoms other than propylene, in which propylene unit is not less than 85 molar %; crystalline poly(1-butene)-based resin such as homopolymer of 1-butene, and copolymer of 1-butene and an alpha-olefin having 2 to 10 carbon atoms other than 1-butene, in which 1-butene unit is not less than 85 molar %; and poly(4-methyl-1-pentene)-based resin such as homopolymer of 4-methyl-1-pentene, and copolymer of 4-methyl-1-pentene and an alpha-olefin having 2 to 10 carbon atoms other than 4-methyl-1-pentene, in which 4-methyl-1-pentene unit not less than 85 molar %. Out of them, the polypropylene-based resin and poly(1-butene)-based resin are preferable. Particularly, the polypropylene-based resin having a melt index (230° C.) of about 0.1 to 100, especially about 0.5 to 50 is very useful.

The peroxide-curable olefin copolymer rubber and the peroxide-decomposing polyolefin resin are mixed in a weight ratio of, generally about 10/90 to 95/5, preferably about 20/80 to 90/10. If the amount of the copolymer rubber is less than the above lower limit, excess decomposition of the resin component by the organic peroxide occurs and causes insufficient crosslinking of the copolymer rubber component as well as too much decrease in viscosity of the resin component, which results in poor dispersion between the partially crosslinked rubber and the resin. On the other hand, if the copolymer rubber is used in an amount higher than the above limit, the resin component in the product partially crosslinked rubber-resin composition is so minor that strength of the product is dissatisfactory. Also, the resin component will have lower fluidity because the amount of the resin having decreased molecular weight is small, and therefore, it is difficult to obtain a sufficient homogeneity in mixing, even if supplemental amount of the resin component is added later to the dynamically heat treated materials from the view to improve strength of the product.

Examples of the organic peroxide are: dicumyl peroxide, di-tert.-butyl peroxide, 2,5-dimethyl-2,5-di(tert.-butyl peroxy) hexane, 2,5-dimethyl-2,5-di(tert.-butylperoxy)hexine-3, 1,3-bis(tert.-butyl peroxy isopropyl)benzene, 1,1-bis(tert.-butyl peroxy)-3,3,5-trimethyl cyclohexane, n-butyl-4,4-bis(tert.-tutyl peroxy)valerate, benzoyl peroxide, p-chlorbenzoyl peroxide, 2,4-dichlorbenzoyl peroxide, tert.-butyl peroxy benzoate, tert.-butyl peroxy isopropyl carbonate, diacetyl peroxide, lauroyl peroxide, and tert.-butyl cumyl peroxide.

Out of these organic peroxides, preferable compounds in view of the anti-scorch stability and odor are: 2,5-dimethyl-2,5-di(tert.-butyl peroxy)hexane, 2,5-dimethyl-2,5-di(tert.-butyl peroxy)hexine-3, 1,3-bis(tert.-butyl peroxy isopropyl)benzene, 1,1-bis(tert.-butyl peroxy)-3,3,3-trimethyl cyclohexane, and n-butyl-4,4-bis(tert.-butyl peroxy)valerate. Among them 1,3-bis(tert.-butyl peroxy isopropyl)benzene is the best.

The above organic peroxide is used in an amount of about 0.01 to 1% by weight, preferably about 0.1 to 0.5% by weight based on the total amount of the peroxide-curable olefin copolymer rubber, peroxide-decomposing polyolefin resin and optional components mentioned after.

The above two components are fed to a twin-screw extruder and subjected to the dynamic heat treatment.

As noted, the peroxide-curable olefin copolymer rubber should be used in the form of particle having specific size: longer diameter "Z" not exceeding 25 mm, preferably 0.5 to 20 mm. In this specification, the term "particle" means any particle form including pellet, granule, crumb and powder. This condition can be usually satisfied with the particle having the weight "X" not exceeding about 200 g/100-particle. It is preferable to use pelletized copolymer rubber weighing about 50 g/100-particle or less. On the other hand, too small sized particle are difficult to produce and, even if commercially produced, expensive. So, it is generally advisable to use the particle weighing about 0.1 g/100-particle or more, preferably about 1 g/100-particle or more. The copolymer rubber particle of such size can be easily produced in accordance with the method, for example, described in U.S. Pat. No. 3,586,089 assigned to the present assignee, using a pelletizer which performs removal of polymerization medium and pelletizing simultaneously.

The other component, the polyolefin resin should be also in the form of particle. Though the size of the resin particle may not be of the same fineness, it is generally preferable that the weight is in the range of about 1 to 10 g/100-particle.

The dynamic heat treatment according to the present invention is preferably carried out under the condition of the specific energy fed to the twin-screw extruder:

$$Y \geq 0.003X + 0.12$$

preferably, $1.5 \geq Y \geq 0.003X + 0.15$, wherein the specific energy is defined as the quotient given by dividing the difference of the driving power of the extruder in which the dynamic heat treatment is performed ($HP_1KW$) and the driving power without load or no material feed under the same screw rotation ($HP_2KW$) with the extruding amount (Q kg/hr). The unit thereof is KW/kg.

The specific energy may be varied by changing the operation conditions of the extruder. It may increase by increase in rotation of the screws, use of a finer screen pack, or decrease in feeding amount of the materials. Also, it depends on the type of the screws. Screws with shallower grooves will give increased specific energy.

For the purpose of preferred practice of the present method, it is essential to perform the dynamic heat treatment giving the specific energy equal to or higher than the energy of the above equation, which energy is determined by the size of the rubber particle. A lower specific energy is dissatisfactory for the dispersion or thorough mixing, and gives the partially crosslinked rubber-resin composition having inferior properties. However, it is preferable that the specific energy does not exceed about 1.5 KWhr/kg, particularly about 1.0 KWhr/kg. If too high the specific energy is given, local elevation of temperature will occur due to transformation of mechanical energy to frictional energy, resulting in deterioration of properties of the product composition. Such an excess energy is of course neigher necessary nor economical.

The twin-screw extruder which may give the above described specific energy includes various types: in which the two screws mutually engage or not. Any type may be used. Examples of commercially available machines are: Werner Extruder (made by Werner in West Germany, two screws engaging and rotating in the same direction, CIM-90 Extruder (made by Nippon Seiko, two screws not engaging and rotating in the different directions) and BT-80 Extruder (made by Hitachi, two screws engaging and rotating in the different directions).

It is possible to provide sufficient specific energy to the materials even in a single-screw extruder by choosing operating conditions thereof. However, our experience shows that it is almost impossible to achieve satisfactory dispersion of the partially crosslinked copolymer rubber and the resin, and therefore, desired products having good properties are not available.

The dynamic heat treatment using the twin-screw extruder is carried out under the conditions of the temperature at which the materials melt, generally about 200° to 280° C., preferably about 210° to 250° C., and the staying time for, generally about 15 to 240 seconds, preferably about 30 to 180 seconds.

Homogeneous and moderate crosslinking reaction can be expected if a crosslinking-aid is present during the heat treatment. Such crosslinking aids are: sulfur, p-quinone dioxime, p,p'-dibenzoyl quinone dioxime, N-methyl-N,4-dinitrosoaniline, nitrobenzene, diphenyl guanidine, trimethylol propane-N,N'-m-phenylene dimaleimide, divinyl benzene, triallyl cyanurate, ethylene glycol dimethacrylate, diethylene glycol dimethacrylate, trimethylol propane trimethacrylate, allyl methacrylate, vinyl butylate, and vinyl stearate.

Out of the above compounds, divinyl benzene is the most preferable, because it is easy to handle and gives the composition having well-balanced properties. More particularly, divinyl benzene is liquid at a normal temperature and dissolves organic peroxide, and further, has good compatibility with the peroxide-curable copolymer rubber and the polypropylene resin, and therefore, is useful as a dispersing agent or diluent of the organic peroxide to improve dispersibility of the organic peroxide into the components of the composition, particularly into the peroxide-curable copolymer rubber component so as to cause homogeneous and moderate crosslinking thereof. Also, divinyl benzene itself provides a radical which acts as a chain transfer agent and crosslinking agent, and therefore, gives crosslinking effect higher than that given by sole use of an organic peroxide crosslinking agent. Further, divinyl benzene exhibits so good reactivity to the organic peroxide that very few portion remains in the produced partially crosslinked rubber-resin composition as the monomer, which may, if present, give odor to the product.

Divinyl benzene may be used in the form of a mixture with some other materials such as hydrocarbons.

The above mentioned various crosslinking aids are used in an amount of about 2 parts by weight, preferably about 0.3 to 1 parts, based on the total 100 parts by weight of the peroxide-curable copolymer rubber and the peroxide-decomposing polyolefin resin components. Too much addition of the crosslinking aid may, if a large amount of the organic peroxide is used, accelate the crosslinking, and as the result, the partially crosslinked rubber-resin composition may have decreased homogeneity and low impact strength. On the other hand, if the amount of the organic peroxide is small, the crosslinking aid will remain in the partially crosslinked rubber-resin composition as unreacted monomer, which causes undesirable change in properties because of thermal effect during processing of the product.

For the purpose of improving further properties of the partially crosslinked rubber-resin composition, mineral oil softener, peroxide-non curable hydrocarbon rubber and peroxide-curable polyolefin resin may be optionally added. Usual amount of addition is in the range of 0 to 400 parts by weight, preferably 5 to 300 parts by weight, based on total 100 parts by weight of the rubber-resin composition. These additives can be added at the dynamic heat treatment. It is preferable to preliminarily add these additives to the rubber and/or resin. The mineral oil softeners are useful for improving processability of the partially crosslinked rubber-resin composition. The same effect can be obtained by addition of the peroxide-non curable hydrocarbon rubber such as polyisobutylene, butyl rubber and propylene-ethylene copolymer rubber containing not higher than 50% ethylene unit. The peroxide-curable polyolefin resin such as polyethylene improves strength and impact resistance of the partially crosslinked rubber-resin composition.

As described above, it is possible to produce partially crosslinked rubber-resin compositions, which are homogeneously blended and have good properties, economically in single step by dynamic heat treatment in a twin-screw extruder under specific conditions in accordance with the present invention. The obtained partially crosslinked rubber-resin compositions may be used as they are or as mixtures with further peroxide-curable or peroxide-decomposing polyolefin resin. Those compositions containing relatively large amount of the partially crosslinked rubber component are useful as thermoplastic elastomers, and those compositions containing relatively large amount of the polyolefin resin are useful as polyolefin resin composition having improved impact strength.

The present invention will be further illustrated by the following examples.

EXAMPLE

[Materials used]

EPT-1: 100 parts by weight of ethylelne/propylene/-dicyclo pentadiene terpolymer rubber [molar ratio of ethylene/propylene:78/22, $ML_{1+4}$ (100° C.):160, iodine value:13], to which 40 parts by weight of mineral oil softener [PW-100, made by Idemitsu Petrochemical] is added.

EPT-2: ethylene/propylene/ethylidene norbornene terpolymer rubber [molar ratio of ethylene/propylene:79/21, $ML_{1+4}$ (100° C.):100, iodine value:15]

PP-1: crystalline polypropylene having melt index (230° C.) of 12 (weight of the particle:3 g/100-particle)

PP-2: crystalline polypropylene containing a small quantity of copolymerized etheylene having melt index (230° C.) of 30 (weight of the particle: 3 g/100-particle)

PER: propylene/ethylene copolymer rubber [molar ratio of propylene/ethylene: 70/30, $[\eta]$(135° C., decaline):3.0 dl/g, weight of the particle:3 g/100-particle]

Organic Peroxide: 1,3-bis(tert.-butyl peroxyisopropyl) benzene

[Compositions]

| | | |
|---|---|---|
| High Hardness Series: (high) | EPT-1 | 70 parts by wt. |
| | PP-1 | 30 |
| | organic peroxide | 0.3 |
| | divinyl benzene | 0.5 |
| Low Hardness Series-1: (low-1) | EPT-1 | 50 parts by wt. |
| | PER | 30 |
| | PP-2 | 20 |
| | organic peroxide | 0.3 |
| | divinyl benzene | 0.5 |
| Low Hardness Series-2: | EPT-2 | 40 parts by wt. |
| | PER | 30 |
| | PP-2 | 20 |
| | mineral oil softener* | 10 |
| | organic peroxide | 0.3 |
| | divinyl benzene | 0.5 |

*"PW-100" made by Idemitsu chemical

[Procedures]

Particle of EPT-1, PP-1 or PP-2, and PER and/or mineral oil softener for the low hardness series, were preliminarily blended in a Henshel Mixer for 60 seconds, and the blends of certain amounts were fed to various extruders through constant feeders. Samples were taken by strand-cutting at dies of the extruders.

In the Controls (shown in Tables I and II), conventional single screw extruder of dia.-90 mm (P-90, made by Nippon Seiko) was used, with which two kinds of screws, i.e., a full freight screw for pelletizing and an end-dalmaged screw having a seal ring for resin-blending (L/D=28 in both the screws) were tested. Detailed operation conditions were as follows:

| cylinder temperature: | $C_1$ | $C_2$ | $C_3$ | $C_4$ | $C_5$ | |
|---|---|---|---|---|---|---|
| | 180 | 210 | 230 | 230 | 200 | (°C.) | rotation of screw: 80 to 210 (rpm)
screen pack: 40×80×150×150×80×40 (mesh) six screens in total
extrusion rate: 160 to 240 (kg/hr)

In some Examples and the Controls for comparison therewith (shown in Tables III through VII), twin-screw extruder (W & P, made by Werner, diameter 90 mm, L/D=43) was used. The specific energy was varied by changing the screw rotation and the extrusion rate. Detailed operation conditions were as follows:

| cylinder temperature: | $C_1$ | $C_2$ | $C_3$ | $C_4$ | D | |
|---|---|---|---|---|---|---|
| | 150 | 210 | 230 | 230 | 200 | (°C.) | rotation of screw: 120 to 200 (rpm)
screen pack: 40×80×150×150×80×40 (mesh) six screens in total
extrusion rate: 170 to 260 (kg/hr)

In the other Examples and the Controls for comparison therewith (shown in Tables VIII and TX), a twin-screw extruder (made by Hitachi, diameter 80 mm, L/D=16) was used. The specific energy was varied by changing the screw rotation and the extrusion rate. Retailed operation conditions were as follows:

| cylinder temperature: | $C_1$ | $C_2$ | $C_3$ | $C_4$ | D | |
|---|---|---|---|---|---|---|
| | 175 | 180 | 230 | 230 | 200 | (°C.) | rotation of screw: 40 to 100 (rpm)
screen pack: 40×80×150×150×80×40 (mesh) six screens in total
extrusion rate: 80 to 150 (kg/hr)

[Evaluation]
1. Homogeneity:
The extruded particle were press-formed at 200° C. to form thin sheets of thickness 0.2 to 0.4 mm, and the surfaces thereof were inspected.
(Grades)
A: quite homogeneous
B: a certain extent of abnormality
C: serious abnormality
2. Processability:
(1) Processability at Injection Molding
Machine: Dynamelter (made by Meiki Manufacturing)
Temperature: 200° C.
Pressure of Injection: primary 1300 kg/cm², secondary 700 kg/cm²
Injecting Pressure: maximum
Processing Speed: 90 seconds/cycle
Mold: square plates type with two point gates
Product: three types of square plates (length:300 mm, width:180 mm, and thickness:2,4, and 7 mm)
The surfaces of the product plates were inspected as done for the above sheets.
(2) Processability at Extrusion Molding
Machine: 40 mm-diameter Extruder (made by Toshiba Machinery)
Temperature: 210° C.
Die: straight die (die/core=12.5 mm/10.0 mm)
Drawing Speed: 10 m/min.
Product: tube
The surfaces of the product tubes thus obtained were inspected as done for the above sheets.
3. Basic Properties:
The above injection-molded square plates (thickness 2 mm) were subjected to measurement of stress at 100% elongation, stress and elongation at breaking, surface hardness and permanent strain (at 100% elongation) in accordance with the testing method defined by JIS K-6301.

[Notes on the Results shown in Tables I through IX]
Table I:
A single-screw extruder was used, and the specific energy was varied in the range from 0.12 to 0.45 by changing rotation of screw and feeding rate. The obtained products of high hardness series are not satisfactory because of insufficient homogeneity and some other properties.
Table II:
Another single-screw extruder was used, and the specific energy was varied in the range from 0.11 to 0.41 by changing rotation of screw and feeding rate. The obtained products of low hardness series were also not satisfactory because of insufficient homogeneity and some other properties.
Table III to VII:
The twin screw extruder made by Werner was used, and the specific energy was varied by changing rotation of screw and extrusion rate. From the experimental data, it was found that the factors giving satisfactory products are as follows:

| Series | X | Z | Y | preferable Y |
|---|---|---|---|---|
| High Hardness | 2 | 6 | 0.14 | 0.19 |
| | 10 | 8 | 0.16 | 0.19 |
| | 30 | 18 | 0.21 | 0.26 |
| Low Hardness-1, -2 | 5 | 7 | 0.15 | 0.17 |
| | 20 | 12 | 0.19 | 0.22 |

Thus, it was concluded that the specific energy "Y" should be such a value as determined by the weight of the copolymer rubber particle "X" according to the equation below:

$$Y \geq 0.003X + 0.12$$

preferably, $$1.5 \geq Y \geq 0.003X + 0.15$$

Table VIII to IX:
A twin screw extruder made by Hitachi was used, and the specific energy was varied by changing rotation of screw and extrusion rate. The data showed that the factors giving satisfactory products are as follows:

| Series | X | Y | preferable y |
|---|---|---|---|
| High Hardness | 10 | 0.17 | 0.19 |
| Low Hardness-1, -2 | 5 | 0.16 | 0.18 |

Table X:
A twin screw extruder made by Hitachi was used to prepare the Low Hardness Series-2. The specific energy was varied by changing rotation of screw and extrusion rate.

TABLE I

| No. | Controls | | | | | | |
|---|---|---|---|---|---|---|---|
| | 1 | 2 | 3 | 4 | 5 | 6 | 7 |
| Screw Type* | 1 | 1 | 1 | 2 | 2 | 2 | 2 |
| Series (Surface Hardness) | high | high | high | high | high | high | high |
| Weight of Rubber particle (g/100-particle) | 2 | 2 | 2 | 2 | 2 | 2 | 2 |
| Specific Energy (KWhr/kg) | 0.12 | 0.17 | 0.35 | 0.11 | 0.20 | 0.31 | 0.45 |
| Homogeneity | C | C | C | C | C | C | C |
| Properties | | | | | | | |
| Stress at 100% elongation (kg/cm²) | 40 | 42 | 45 | 41 | 41 | 44 | 46 |
| Stress at Breaking (kg/cm²) | 58 | 60 | 70 | 58 | 60 | 70 | 75 |
| Elongation at Breaking (%) | 140 | 170 | 190 | 150 | 170 | 180 | 210 |
| Surface Hardness (JIS A) | 85 | 84 | 85 | 85 | 85 | 84 | 85 |
| Permanent Strain (%) | 41 | 33 | 31 | 40 | 36 | 33 | 30 |
| Evaluation of Surface | | | | | | | |
| Injection Molded Article | C | C | C | C | C | C | C |
| Extrusion Molded Article | C | C | C | C | C | C | C |

*type 1: full freight
type 2: end-dalmaged with seal ring

TABLE II

| No. | Controls | | | | | | |
|---|---|---|---|---|---|---|---|
| | 8 | 9 | 10 | 11 | 12 | 13 | 14 |
| Screw Type* | 1 | 1 | 1 | 2 | 2 | 2 | 2 |
| Series (Surface Hardness) | low-1 | low-1 | low-1 | low-1 | low-1 | low-1 | low-1 |
| Weight of Rubber particle (g/100-particle) | 5 | 5 | 5 | 5 | 5 | 5 | 5 |
| Specific Energy (KWhr/kg) | 0.11 | 0.19 | 0.31 | 0.10 | 0.21 | 0.34 | 0.41 |
| Homogeneity | C | C | C | C | C | C | C |
| Properties | | | | | | | |
| Stress at 100% elongation (kg/cm²) | 23 | 25 | 25 | 24 | 25 | 25 | 26 |
| Stress at Breaking (kg/cm²) | 35 | 37 | 39 | 35 | 36 | 38 | 40 |
| Elongation at Breaking (%) | 140 | 170 | 190 | 150 | 170 | 200 | 220 |
| Surface Hardness (JIS A) | 64 | 65 | 65 | 64 | 65 | 65 | 65 |
| Permanent Strain (%) | 26 | 23 | 20 | 25 | 24 | 21 | 19 |
| Evaluation of Surface | | | | | | | |
| Injection Molded Article | C | C | C | C | C | C | C |
| Extrusion Molded Article | C | C | C | C | C | C | C |

*type 1: full freight
type 2: end-dalmaged with seal ring

TABLE III

| No. | Controls | | Examples | | | |
|---|---|---|---|---|---|---|
| | 15 | 16 | 17 | 18 | 19 | 20 |
| Series (Surface Hardness) | high | high | high | high | high | high |
| Weight of Rubber particle (g/100-particle) | 2 | 2 | 2 | 2 | 2 | 2 |
| Specific Energy (KWhr/kg) | 0.10 | 0.12 | 0.14 | 0.19 | 0.25 | 0.31 |
| Homogeneity | C | C | B | A | A | A |
| Properties | | | | | | |
| Stress at 100% elongation (kg/cm²) | 43 | 45 | 49 | 50 | 50 | 51 |
| Stress at Breaking (kg/cm²) | 60 | 71 | 125 | 131 | 130 | 130 |
| Elongation at Breaking (%) | 160 | 190 | 470 | 490 | 480 | 480 |
| Surface Hardness (JIS A) | 84 | 84 | 85 | 85 | 85 | 85 |
| Permanent Strain (%) | 37 | 33 | 20 | 17 | 18 | 17 |
| Evaluation of Surface | | | | | | |
| Injection Molded Article | C | C | B | A | A | A |
| Extrusion Molded Article | C | C | B | A | A | A |

TABLE IV

| No. | Controls | | Examples | | | |
|---|---|---|---|---|---|---|
| | 21 | 22 | 23 | 24 | 25 | 26 |
| Series (Surface Hardness) | high | high | high | high | high | high |
| Weight of Rubber particle (g/100-particle) | 10 | 10 | 10 | 10 | 10 | 10 |
| Specific Energy (KWhr/kg) | 0.13 | 0.14 | 0.16 | 0.19 | 0.24 | 0.31 |
| Homogeneity | C | C | B | A | A | A |
| Properties | | | | | | |
| Stress at 100% elongation (kg/cm²) | 42 | 44 | 48 | 51 | 51 | 50 |

TABLE IV-continued

|  | Controls | | Examples | | | |
|---|---|---|---|---|---|---|
| No. | 21 | 22 | 23 | 24 | 25 | 26 |
| Stress at Breaking (kg/cm$^2$) | 58 | 70 | 121 | 130 | 133 | 132 |
| Elongation at Breaking (%) | 130 | 180 | 450 | 480 | 490 | 480 |
| Surface Hardness (JIS A) | 84 | 83 | 85 | 85 | 85 | 85 |
| Permanent Strain (%) | 39 | 36 | 21 | 17 | 18 | 17 |
| Evaluation of Surface | | | | | | |
| Injection Molded Article | C | C | B | A | A | A |
| Extrusion Molded Article | C | C | B | A | A | A |

TABLE V

|  | Controls | | Examples | | |
|---|---|---|---|---|---|
| No. | 27 | 28 | 29 | 30 | 31 |
| Series (Surface Hardness) | high | high | high | high | high |
| Weight of Rubber particle (y/100-particle) | 30 | 30 | 30 | 30 | 30 |
| Specific Energy (KWhr/kg) | 0.15 | 0.19 | 0.21 | 0.26 | 0.30 |
| Homogeneity | C | C | B | A | A |
| Properties | | | | | |
| Stress at 100% elongation (kg/cm$^2$) | 43 | 43 | 49 | 51 | 50 |
| Stress at Breaking (kg/cm$^2$) | 59 | 68 | 120 | 130 | 131 |
| Elongation at Breaking (%) | 170 | 190 | 460 | 490 | 490 |
| Surface Hardness (JIS A) | 83 | 83 | 85 | 85 | 85 |
| Permanent Strain (%) | 37 | 35 | 20 | 17 | 17 |
| Evaluation of Surface | | | | | |
| Injection Molded Article | C | C | B | A | A |
| Extrusion Molded Article | C | C | B | A | A |

TABLE VI

|  | Controls | | Examples | | | |
|---|---|---|---|---|---|---|
| No. | 32 | 33 | 34 | 35 | 36 | 37 |
| Series (Surface Hardness) | low-1 | low-1 | low-1 | low-1 | low-1 | low-1 |
| Weight of Rubber particle (g/100-particle) | 5 | 5 | 5 | 5 | 5 | 5 |
| Specific Energy (KWhr/kg) | 0.12 | 0.13 | 0.15 | 0.17 | 0.21 | 0.31 |
| Homogeneity | C | C | B | A | A | A |
| Properties | | | | | | |
| Stress at 100% elongation (kg/cm$^2$) | 25 | 26 | 31 | 30 | 30 | 31 |
| Stress at Breaking (kg/cm$^2$) | 38 | 40 | 62 | 65 | 64 | 65 |
| Elongation at Breaking (%) | 150 | 200 | 420 | 450 | 450 | 460 |
| Surface Hardness (JIS A) | 63 | 64 | 65 | 65 | 65 | 65 |
| Permanent Strain (%) | 24 | 19 | 9 | 8 | 8 | 8 |
| Evaluation of Surface | | | | | | |
| Injection Molded Article | C | C | B | A | A | A |
| Extrusion Molded Article | C | C | B | A | A | A |

TABLE VII

|  | Controls | | Examples | | |
|---|---|---|---|---|---|
| No. | 38 | 39 | 40 | 41 | 42 |
| Series (Surface Hardness) | low-1 | low-1 | low-1 | low-1 | low-1 |
| Weight of Rubber particle (g/100-particle) | 20 | 20 | 20 | 20 | 20 |
| Specific Energy (KWhr/kg) | 0.13 | 0.17 | 0.19 | 0.22 | 0.31 |
| Homogeneity | C | C | B | A | A |
| Properties | | | | | |
| Stress at 100% elongation (kg/cm$^2$) | 25 | 26 | 31 | 30 | 31 |
| Stress at Breaking (kg/cm$^2$) | 35 | 39 | 64 | 65 | 65 |
| Elongation at Breaking (%) | 120 | 180 | 430 | 460 | 470 |
| Surface Hardness (JIS A) | 61 | 63 | 65 | 65 | 65 |
| Permanent Strain (%) | 26 | 20 | 8 | 8 | 7 |
| Evaluation of Surface | | | | | |
| Injection Molded Article | C | C | B | A | A |
| Extrusion Molded Article | C | C | B | A | A |

TABLE VIII

|  | Controls | | Examples | | | |
|---|---|---|---|---|---|---|
| No. | 43 | 44 | 45 | 46 | 47 | 48 |
| Series (Surface Hardness) | high | high | high | high | high | high |
| Weight of Rubber particle (g/100-particle) | 10 | 10 | 10 | 10 | 10 | 10 |
| Specific Energy (KWhr/kg) | 0.11 | 0.14 | 0.17 | 0.19 | 0.25 | 0.30 |
| Homogeneity | C | C | B | A | A | A |
| Properties | | | | | | |
| Stress at 100% elongation (kg/cm$^2$) | 41 | 43 | 51 | 50 | 50 | 51 |
| Stress at Breaking (kg/cm$^2$) | 61 | 68 | 120 | 130 | 125 | 135 |
| Elongation at Breaking (%) | 140 | 190 | 460 | 480 | 460 | 470 |
| Surface Hardness (JIS A) | 83 | 83 | 85 | 85 | 85 | 85 |
| Permanent Strain (%) | 38 | 34 | 19 | 18 | 17 | 18 |
| Evaluation of Surface | | | | | | |

TABLE VIII-continued

| No. | Controls | | Examples | | | |
|---|---|---|---|---|---|---|
| | 43 | 44 | 45 | 46 | 47 | 48 |
| Injection Molded Article | C | C | B | A | A | A |
| Extrusion Molded Article | C | C | B | A | A | A |

TABLE IX

| No. | Controls | | Examples | | | |
|---|---|---|---|---|---|---|
| | 49 | 50 | 51 | 52 | 53 | 54 |
| Series (Surface Hardness) | low-1 | low-1 | low-1 | low-1 | low-1 | low-1 |
| Weight of Rubber particle (g/100-particle) | 5 | 5 | 5 | 5 | 5 | 5 |
| Specific Energy (KWhr/kg) | 0.11 | 0.13 | 0.16 | 0.18 | 0.25 | 0.30 |
| Homogeneity | C | C | B | A | A | A |
| Properties | | | | | | |
| Stress at 100% elongation (kg/cm$^2$) | 24 | 25 | 30 | 29 | 31 | 30 |
| Stress at Breaking (kg/cm$^2$) | 39 | 42 | 61 | 63 | 65 | 66 |
| Elongation at Breaking (%) | 140 | 180 | 420 | 440 | 450 | 450 |
| Surface Hardness (JIS A) | 62 | 63 | 65 | 65 | 65 | 65 |
| Permanent Strain (%) | 25 | 20 | 10 | 8 | 8 | 8 |
| Evaluation of Surface | | | | | | |
| Injection Molded Article | C | C | B | A | A | A |
| Extrusion Molded Article | C | C | B | A | A | A |

TABLE X

| No. | Controls | | Examples | | |
|---|---|---|---|---|---|
| | 51 | 52 | 55 | 56 | 57 |
| Series (Surface Hardness) | low-2 | low-2 | low-2 | low-2 | low-2 |
| Weight of Rubber particle (g/100-particle) | 5 | 20 | 5 | 5 | 20 |
| Specific Energy (KWhr/kg) | 0.13 | 0.10 | 0.16 | 0.20 | 0.20 |
| Homogeneity | C | C | B | A | A |
| Properties | | | | | |
| Stress at 100% elongation (kg/cm$^2$) | 25 | 23 | 30 | 31 | 30 |
| Stress at Breaking (kg/cm$^2$) | 35 | 33 | 55 | 61 | 60 |
| Elongation at Breaking (%) | 170 | 150 | 400 | 430 | 420 |
| Surface Hardness (JIS A) | 62 | 60 | 63 | 64 | 64 |
| Permanent Strain (%) | 21 | 24 | 10 | 9 | 9 |
| Evaluation of Surface | | | | | |
| Injection Molded Article | C | C | B | A | A |
| Extrusion Molded Article | C | C | A | A | A |

We claim:

1. A method of producing partially crosslinked rubber-resin composition comprising directly feeding a pelletized peroxide-curable olefin copolymer rubber and a peroxide-decomposing polyolefin resin together with an organic peroxide compound to a twin-screw extruder so that the rubber and the resin are subjected to a dynamic heat treatment in the presence of the peroxide under the following conditions:

$X \leq 200$, and $Y \geq 0.003X + 0.12$ wherein "X" is the weight of the copolymer rubber (g/100 particle), and "Y" is the specific energy at the extrusion (KWhr/kg).

2. A method of producing partially crosslinked rubber-resin composition according to claim 1, in which the dynamic heat treatment is carried out under the condition:

$Z \leq 25$ wherein "Z" stands for the longer diameter (mm) of particle of the peroxide-curable olefin copolymer rubber.

3. A method of producing partially crosslinked rubber-resin composition according to claim 2, in which the dynamic heat treatment is carried out under the condition:

$0.5 \leq Z \leq 20$.

4. A method of producing partially crosslinked rubber-resin composition according to claim 1, in which the copolymer rubber particle having "X" of 0.1 or more are used.

5. A method of producing partially crosslinked rubber-resin composition according to claim 1, in which the dynamic heat treatment is carried out under the extruder specific energy "Y" of 1.5 or less.

* * * * *